(12) United States Patent
Shin

(10) Patent No.: US 9,631,687 B2
(45) Date of Patent: Apr. 25, 2017

(54) ELECTRONIC PARKING BRAKE APPARATUS

(71) Applicant: HYUNDAI MOBIS CO., LTD., Seoul (KR)

(72) Inventor: Choong Sik Shin, Yongin (KR)

(73) Assignee: HYUNDAI MOBIS CO., LTD, Seoul (KR)

( * ) Notice: Subject to any disclaimer, the term of this patent is extended or adjusted under 35 U.S.C. 154(b) by 0 days.

(21) Appl. No.: 14/750,955

(22) Filed: Jun. 25, 2015

(65) Prior Publication Data

US 2016/0123420 A1  May 5, 2016

(30) Foreign Application Priority Data

Nov. 4, 2014 (KR) .................. 10-2014-0152203

(51) Int. Cl.
| | |
|---|---|
| F16D 65/22 | (2006.01) |
| F16D 51/28 | (2006.01) |
| B60T 13/74 | (2006.01) |
| F16D 121/24 | (2012.01) |
| F16D 125/40 | (2012.01) |
| F16D 125/60 | (2012.01) |

(52) U.S. Cl.
CPC ............ *F16D 65/22* (2013.01); *B60T 13/746* (2013.01); *F16D 51/28* (2013.01); *F16D 2121/24* (2013.01); *F16D 2125/40* (2013.01); *F16D 2125/60* (2013.01)

(58) Field of Classification Search
CPC .......... F16D 65/22; F16D 65/56; F16D 65/66; F16D 65/561; F16D 65/562; F16D 51/28
USPC ................. 188/79.52, 79.56, 79.51
See application file for complete search history.

(56) References Cited

U.S. PATENT DOCUMENTS

2015/0183413 A1* 7/2015 Roos ............ B60T 7/107
                                                188/156

FOREIGN PATENT DOCUMENTS

| DE | 906050 C | * | 3/1954 | ............ F16D 51/28 |
|---|---|---|---|---|
| JP | 2003-301871 A | | 10/2003 | |
| JP | 2007-106327 A | | 4/2007 | |
| WO | WO 2014/040740 A1 | | 3/2014 | |

OTHER PUBLICATIONS

EPO machine translation, DE 906050 C, Mar. 1954.*

* cited by examiner

*Primary Examiner* — Thomas J Williams

(57) ABSTRACT

Disclosed is an electronic parking brake apparatus. The electronic parking brake apparatus includes: a power generating unit which generates power based on an external signal; a braking force transmission unit which is coupled to the power generating unit in a threaded connection manner, rectilinearly moves by the power, and transmits braking force generated by the rectilinear movement; a braking force supplementing unit which is disposed to be adjacent to the power generating unit while surrounding the braking force transmission unit in order to prevent the braking force from being decreased; and a brake body part which is connected with the braking force transmission unit and parks a vehicle by using the braking force.

8 Claims, 5 Drawing Sheets

ELECTRONIC PARKING BRAKE APPARATUS

CROSS-REFERENCE TO RELATED APPLICATIONS

This application claims priority to and the benefit of Korean Patent Application No. 10-2014-0152203 filed in the Korean Intellectual Property Office on Nov. 4, 2014, the entire contents of which are incorporated herein by reference.

TECHNICAL FIELD

The present invention relates to an electronic parking brake apparatus.

BACKGROUND ART

In general, a parking brake apparatus is used to prevent a parked vehicle from moving.

The parking brake apparatus is classified into a manual parking brake apparatus that the user manipulates by hand, and an electronic parking brake apparatus that is operated by a motor, and the electronic parking brake (EPB) apparatus brakes wheels while converting rotational motion of the motor into rectilinear motion.

That is, in the case of the electronic parking brake apparatus, when the user operates the motor by manipulating a button, a switch, or a lever, a gear unit and a nut screw are rotated as the motor is rotated, a bolt screw, which penetrates the nut screw, is moved in a longitudinal direction thereof, and a parking cable connected to the bolt screw is pulled such that a brake friction member and a brake drum come into close contact with each other, thereby braking a vehicle by using parking braking force that is generated when the brake friction member and the brake drum come into close contact with each other.

In the related art, in order to park the vehicle, the user manipulates the parking brake apparatus to park the vehicle after the user operates a main brake first. When the user releases the main brake after the user manipulates the parking brake apparatus in a state in which the main brake has been operated, parking braking force of the parking brake apparatus is partially lost such that braking force may be decreased during a braking operation, or frictional force between the brake friction member and the drum of the wheel is decreased due to contraction of the brake friction member caused by a change in temperature, such that parking braking force may be decreased. The decrease in parking braking force causes a parked state of the vehicle to be unstable, and causes the parked vehicle to be undesirably moved, and as a result, there is concern that a safety accident will occur. Accordingly, there is a need for an apparatus that may appropriately prevent a loss of parking braking force.

SUMMARY OF THE INVENTION

The present invention has been made in an effort to provide an electronic parking brake apparatus capable of consistently maintaining a stable parked state by effectively preventing parking braking force from being decreased due to various reasons.

An exemplary embodiment of the present invention provides an electronic parking brake apparatus including: a power generating unit which generates power based on an external signal; a braking force transmission unit which is coupled to the power generating unit in a threaded connection manner, rectilinearly moves by the power, and transmits braking force generated by the rectilinear movement; a braking force supplementing unit which is disposed to be adjacent to the power generating unit while surrounding the braking force transmission unit; and a brake body part which is connected with the braking force transmission unit and parks a vehicle by using the braking force.

The power generating unit may include: a motor which generates power based on the external signal; a gear unit which is operated by an operation of the motor; and a nut screw which is connected with the gear unit and rotated by an operation of the gear unit.

The braking force transmission unit may include: a bolt screw which is coupled to the nut screw in a threaded connection manner, and rectilinearly moves in a longitudinal direction while penetrating the nut screw; and a cable which has one end connected with the bolt screw, and the other end connected to the brake body part.

The braking force supplementing unit may include: a cylindrical portion which is disposed in a direction that faces the nut screw, and has a hollow circular shape to accommodate the bolt screw; and an elastic member which is adjacent to the nut screw, and surrounds an outer surface of the cylindrical portion.

The elastic member may be a coil spring or a disc spring.

The nut screw may press the elastic member while being moved in a direction of the cylindrical portion by the rectilinear movement of the bolt screw.

The cylindrical portion may be spaced apart from the nut screw by 3 mm or more.

The brake body part may include: an operating lever which is connected with the cable and operated depending on the braking force; brake shoes which have inner portions coupled to the lever, and have both sides that expand by the operating lever that is operated depending on the braking force; an anchor block which is connected with the operating lever, and supports both the sides of the brake shoes; and a drum which accommodates therein the brake shoes, and parks the vehicle by using frictional force that is generated when outer portions of the brake shoes come into direct contact with an inner wall of the drum by the expansion of the brake shoes.

When a predetermined gap is formed between the anchor block and the brake shoe due to a decrease in braking force, the elastic member may remove the predetermined gap by moving the nut screw using elastic restoring force.

According to the electronic parking brake apparatus according to the exemplary embodiment of the present invention, when frictional force between the brake drum and the brake friction member is decreased during a braking operation or due to contraction of the brake friction member caused by a change in temperature, such that parking braking force is partially lost, the lever is additionally pulled by elastic restoring force of the spring to allow the brake friction member to come into close contact with the brake drum, thereby assuredly preventing the braking force of the parking brake from being partially lost.

Accordingly, by applying the electronic parking brake apparatus, which provides improved parking braking force, to the vehicle, it is possible to maintain the vehicle in a consistent and stable parked state, prevent the parked vehicle from being undesirably moved due to a partial loss of parking braking force, and prevent a safety accident caused by a partial loss of parking braking force, thereby improving marketability of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
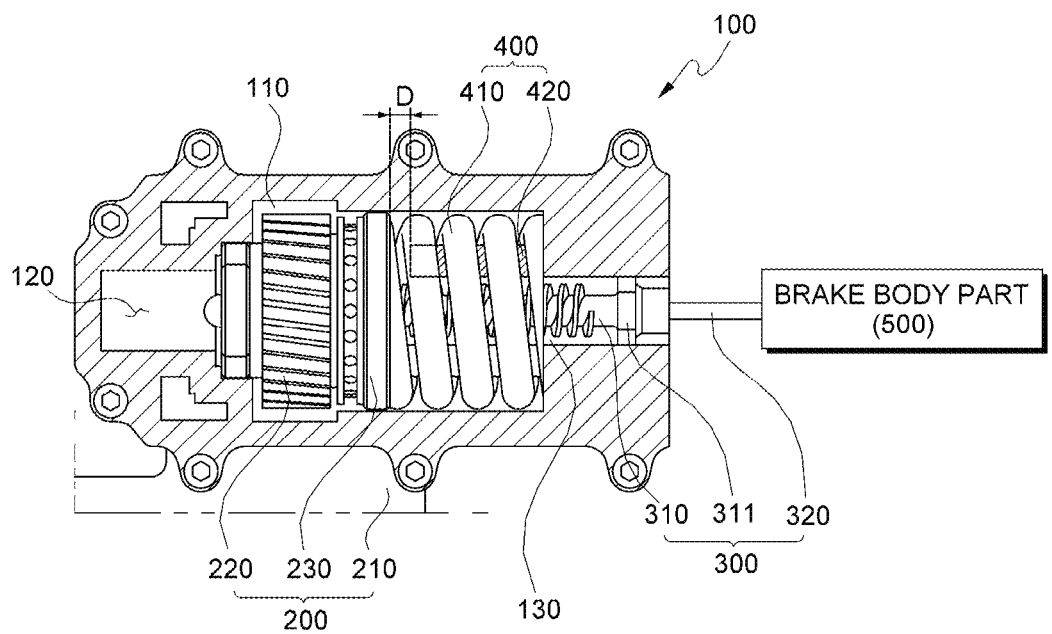
FIG. 1 is a cross-sectional view schematically illustrating an electronic parking brake apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In order to sufficiently understand the object that will be achieved by the present invention, advantages in operation of the present invention, and implementation of the present invention, reference needs to be made to the accompanying drawings for illustrating an exemplary embodiment of the present invention and contents disclosed in the accompanying drawings.

Hereinafter, an exemplary embodiment of the present invention will be described in detail with reference to the accompanying drawings. However, the present invention may be modified in various different ways, and is not limited to the exemplary embodiment to be described below. Further, a part irrelevant to the description will be omitted to clearly describe the present disclosure, and the same constituent elements will be designated by the same reference numerals.

Unless explicitly described to the contrary, the word "comprise" and variations such as "comprises" or "comprising", will be understood to imply the inclusion of stated elements but not the exclusion of any other elements.

Referring to FIG. 1, an electronic parking brake apparatus according to an exemplary embodiment of the present invention may include a housing 100, a power generating unit 200, a braking force transmission unit 300, a braking force supplementing unit 400, and a brake body part 500.

The housing 100 may have a vacant space having a predetermined size, and may be made of a synthetic resin or a metallic material. The housing 100 may prevent components, such as the power generating unit 200, the braking force transmission unit 300, and the braking force supplementing unit 400, which are installed in the housing 100, from being damaged by external impact or being contaminated by foreign substances that flow in from the outside.

A first accommodating space 110, in which the power generating unit 200, the braking force transmission unit 300, and the braking force supplementing unit 400 are installed, may be formed at a central portion of the housing 100.

A second accommodating space 120, in which the braking force transmission unit 300 may be rectilinearly moved in a braking direction of the parking brake and then positioned, may be formed at one side of the housing 100 (the left side in FIG. 1) so as to be in communication with the first accommodating space 110.

A third accommodating space 130, in which the braking force transmission unit 300 may be rectilinearly moved and then positioned, may be formed at the other side of the housing 100 (the right side in FIG. 1) so as to be in communication with the first accommodating space 110. The third accommodating space 130 may be smaller in size than the first accommodating space 110.

The power generating unit 200 is an apparatus that generates power based on an external signal, and may include a motor 210, a gear unit 220, and a nut screw 230.

The motor 210 may be installed inside or outside the housing 100. For example, the motor 200 according to the exemplary embodiment of the present invention is installed outside the housing 100.

The motor 210 may be controlled by an electronic control unit (ECU) of a vehicle. The motor 210 may convert electrical energy, which is applied from the outside under the control of the ECU, into rotational energy. The rotational energy converted by the motor 210 is controlled by the ECU and transmitted to the gear unit 220, thereby rotating the gear unit 220.

The gear unit 220 is operated by power transmitted from the motor 210, and may be installed in the first accommodating space 110 of the housing 100.

The gear unit 220 may include a worm gear and a helical gear that are connected with the motor 210 and rotated at the same time when the motor 210 rotates.

The worm gear is connected to a rotating shaft of the motor 210, and may have a plurality of teeth formed on an outer circumferential surface thereof.

The helical gear has an outer side that is formed to be engaged with the teeth of the worm gear in a perpendicular direction with respect to the teeth of the worm gear, and may have one end that is connected to the nut screw 230. The helical gear is coupled to the nut screw 230 so as to be rotated integrally with the nut screw 230, and the helical gear and the nut screw 230 may be rotated together as the worm gear is rotated. Screw threads, which may be coupled to the braking force transmission unit 300 in a threaded connection manner, may be formed on an inner circumferential surface of the helical gear.

The nut screw 230 may be installed in the first accommodating space 110 of the housing 100.

The nut screw 230 may have screw threads formed on an inner circumferential surface thereof so that the braking force transmission unit 300 penetrates the nut screw 230 and is coupled to the nut screw 230 in a threaded connection manner.

When the braking force transmission unit 300 is moved into the second accommodating space 120 when the parking brake is locked, the nut screw 230, together with the gear unit 220, is moved in the opposite direction to the direction in which the braking force transmission unit 300 is moved.

That is, the nut screw 230 is moved in a right direction (rightward in FIG. 1), and at this time, presses the braking force supplementing unit 400.

When the braking force supplementing unit 400 is released as braking force is decreased during a braking operation or braking force is decreased due to contraction of a friction member, the nut screw 230 returns to an initial position by elastic restoring force of the braking force supplementing unit 400, thereby preventing braking force from being decreased during a braking operation, or preventing braking force from being decreased due to the contraction of the friction member.

The braking force transmission unit 300 is an apparatus that converts power generated by the power generating unit 200 into braking force, and transmits the converted braking force to the brake body part 500, and may include a bolt screw 310 and a cable 320.

One side of the bolt screw 310 (the left side in FIG. 1) may be positioned in the first accommodating space 110 of the housing 100, and the other side of the bolt screw 310 (the right side in FIG. 1) may be positioned in the third accommodating space 130 of the housing 100.

The bolt screw 310 has screw threads formed on an outer circumferential surface thereof so as to be coupled to the nut screw 230 in a threaded connection manner, and may reciprocate rectilinearly in a longitudinal direction thereof while penetrating the nut screw 230.

The bolt screw 310 may have an anti-rotation member 311 at the other side (the right side in FIG. 1) that is connected with the cable 320. An outer circumferential surface of the anti-rotation member 311 is tightly attached to the third accommodating space 130, and may be formed in a polygonal shape in order to prevent the bolt screw 310 from being rotated.

The bolt screw 310 is prevented by the anti-rotation member 311 from being rotated, and thus may reciprocate rectilinearly by the rotation of the nut screw 230.

One end of the cable 320 may be connected with the bolt screw 310, and the other end of the cable 320 may be connected with the brake body part 500. When the bolt screw 310 is rectilinearly moved, the cable 320 is moved at the same time, thereby providing braking force to the brake body part 500.

The braking force supplementing unit 400 is installed to prevent braking force from being decreased during a brake locking operation and prevent braking force from being decreased due to contraction of the friction member, and may include an elastic member 410, and a cylindrical portion 420.

The elastic member 410 may be installed in the first accommodating space 110 of the housing 100. The elastic member 410 may be a coil spring. While the elastic member 410 according to the exemplary embodiment of the present invention is described as being a coil spring, the present invention is not limited thereto, and other types of springs such as a disc spring may be used as the elastic member 410.

One side of the elastic member 410 may be disposed to be adjacent to the nut screw 230. The elastic member 410 may be compressed by the nut screw 230, and may allow the nut screw 230 to return to the initial position by using elastic restoring force of the elastic member 410.

The cylindrical portion 420 is integrally formed in the housing 100, and may accommodate therein the bolt screw 310 of the braking force transmission unit 300.

The cylindrical portion 420 may have an accommodating space that extends from the third accommodating space 130 of the housing 100. The cylindrical portion 420 may be formed to be spaced apart from the nut screw 230 at a predetermined interval D of, for example, 3 mm or more.

The brake body part 500 is an apparatus that is coupled to the wheel of the vehicle, generates frictional force by using braking force transmitted from the braking force transmission unit 300, and brakes the vehicle by using the generated frictional force.

When frictional force is decreased during a brake locking operation or due to contraction of the friction member caused by a change in temperature, the brake body part 500 cannot fully brake the vehicle. However, the braking force supplementing unit 400 according to the exemplary embodiment of the present invention may supplement braking force, thereby fully braking the vehicle by preventing frictional force from being decreased.

Figure 2:
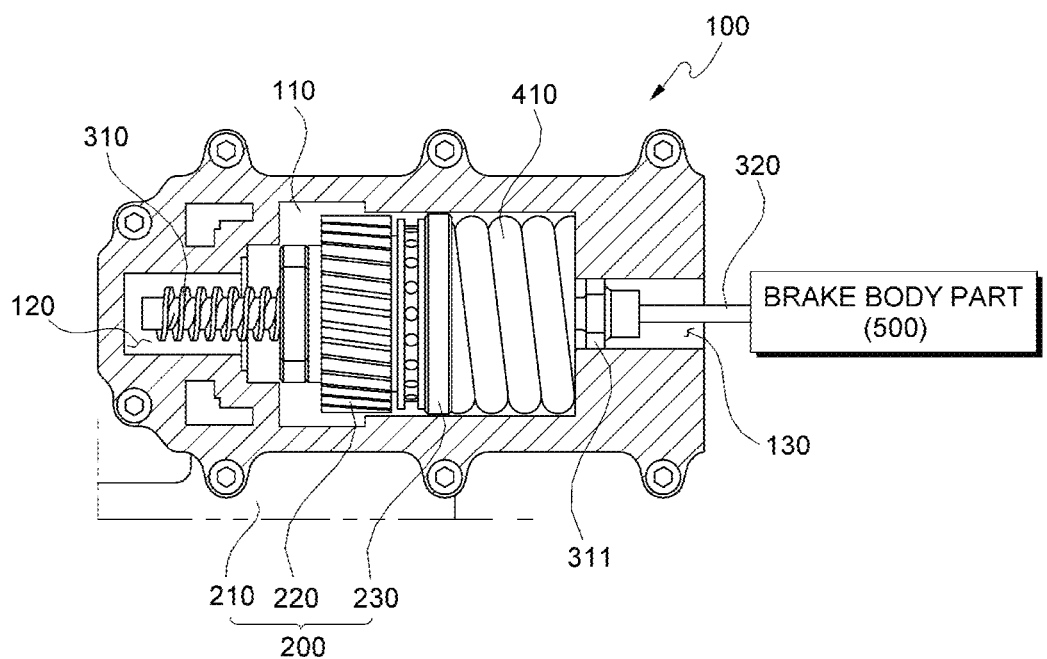
FIG. 2 is a cross-sectional view schematically illustrating a braking state of the electronic parking brake apparatus according to the exemplary embodiment of the present invention.

An operational process of the electronic parking brake apparatus according to the exemplary embodiment of the present invention will be described with reference to FIG. 2.

When a user operates the electronic parking brake apparatus by manipulating a button, a switch, a lever, or the like, the EUC operates the power generating unit 200.

The gear unit 220 is rotated by rotational force generated by the motor 210 of the power generating unit 200. The rotational force of the motor 210 is transmitted to the worm gear of the gear unit 220, and the worm gear may rotate the helical gear.

As the helical gear is rotated, the nut screw 230 is rotated, and as the nut screw 230 is rotated, the bolt screw 310 of the braking force transmission unit 300 is moved and positioned in the second accommodating space 120 of the housing 100. In this case, the bolt screw 310 is prevented by the anti-rotation member 311 from being rotated, and moved rectilinearly in the longitudinal direction thereof.

The gear unit 220 and the nut screw 230 may be moved in a direction of the braking force supplementing unit 400 by the bolt screw 310 that is moved to the second accommodating space 120. Therefore, the gear unit 220 and the nut screw 230 are moved at the same time, and press the elastic member 410 of the braking force supplementing unit 400.

Here, when braking force is decreased during a brake locking operation or braking force is decreased due to contraction of the friction member caused by a change in temperature, the compressed elastic member 410 returns to an initial state while extending by elastic restoring force thereof, and as a result, the gear unit 220 and the nut screw 230 return to initial positions, and the bolt screw 310 and the cable 320, which are connected to the gear unit 220 and the nut screw 230, are also moved together with the gear unit 220 and the nut screw 230. Therefore, the brake body part 500, which is supplied with additional braking force, may brake the vehicle to place the vehicle in a completely stopped state.

Figure 3:
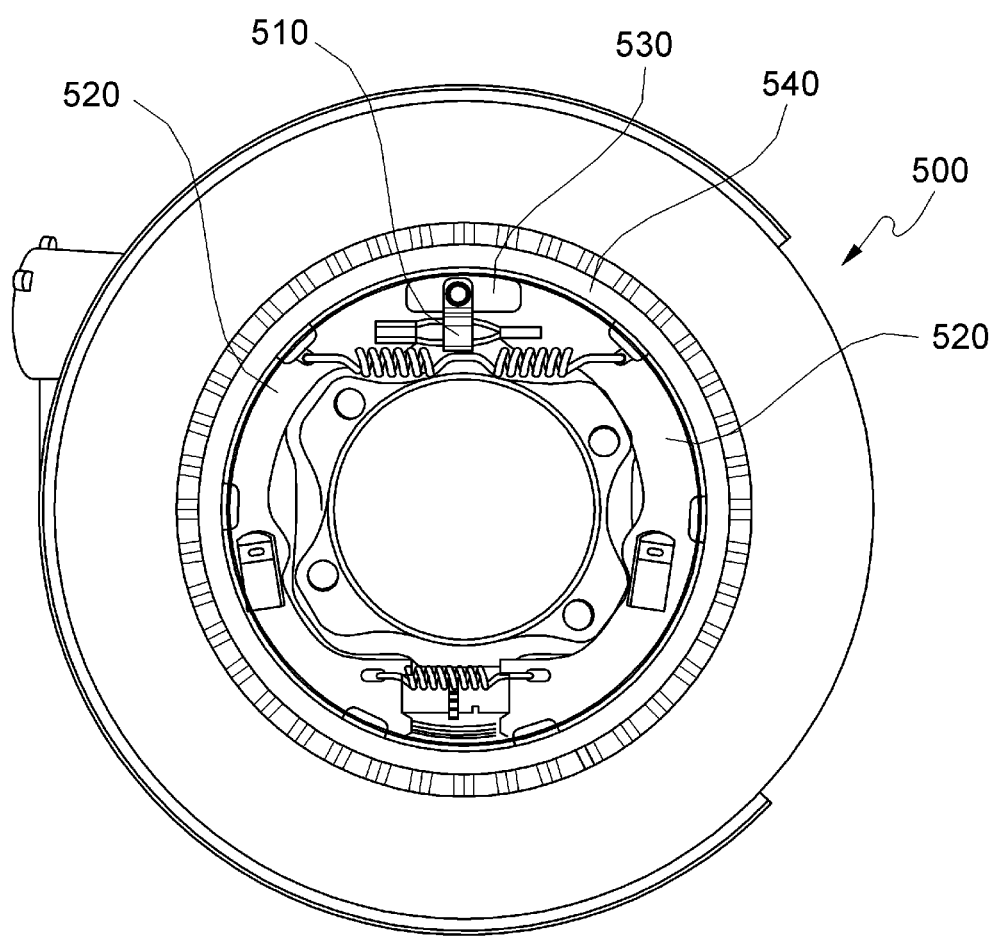
FIG. 3 is a front view illustrating a brake body part of the electronic parking brake apparatus according to the exemplary embodiment of the present invention.

The brake body part 500 according to the exemplary embodiment of the present invention will be described with reference to FIG. 3.

The brake body part 500 may include an operating lever 510, brake shoes 520, an anchor block 530, and a drum 540.

The operating lever 510 may be connected to the cable 320 of the braking force transmission unit 300. The operating lever 510 is operated in conjunction with the cable 320 when the cable 320 is pulled in a direction of the second accommodating space 120 of the housing 100.

The pair of brake shoes 520 is coupled to both sides of the operating lever 510. When the operating lever 510, which is operated in conjunction with the cable 320, is operated in left and right directions (leftward and rightward in FIG. 3), the pair of brake shoes 520 expands radially outward, and the drum 540 selectively comes into close contact with the pair of brake shoes 520, thereby generating parking braking force.

The anchor block 530 is connected with the operating lever 510 and fixed to adjust intervals between both sides of the brake shoes 520 or support both sides of the brake shoes 520.

The drum 540 is coupled to the wheel of the vehicle so as to be rotated integrally with the wheel of the vehicle, and accommodates therein the brake shoe 520 and the anchor block 530. An inner wall of the drum 540 comes into direct contact with outer portions of the brake shoes 520 as the brake shoes 520 expand, thereby braking the wheel by using frictional force that is generated when the drum 540 comes into direct contact with the brake shoes 520.

Figure 4:
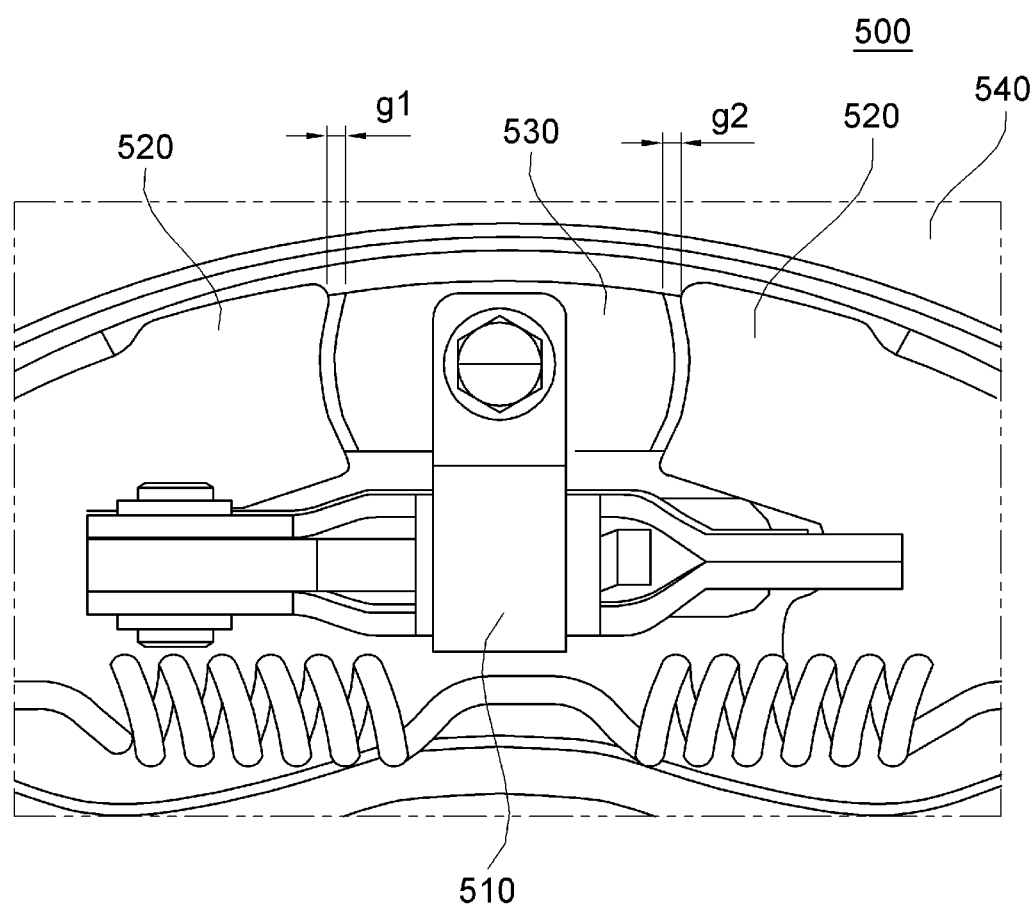
FIGS. 4 to 6 are explanatory views for explaining a method of preventing a decrease in parking braking force caused by various reasons in the electronic parking brake apparatus according to the exemplary embodiment of the present invention.

A method of preventing a decrease in braking force, which has occurred in the related art due to various reasons, by the electronic parking brake apparatus according to the exemplary embodiment of the present invention will be described with reference to FIGS. 4 to 6. When the electronic parking brake apparatus of the vehicle is locked, both sides of the operating lever 510 connected with the cable 320 expand in the left and right directions to push the brake shoes 520 such that the brake shoes 520 expand radially outward.

When both the sides of the brake shoes 520 expand and come into direct contact with the inner wall of the drum 540, predetermined gaps g1 and g2 are formed between the anchor block 530 and the brake shoes 520. Here, the gaps g1 and g2 have nearly the same size at both sides of the anchor block 530, and in this case, the gaps g1 and g2 mean that the electronic parking brake apparatus are normally operated.

Figure 5:
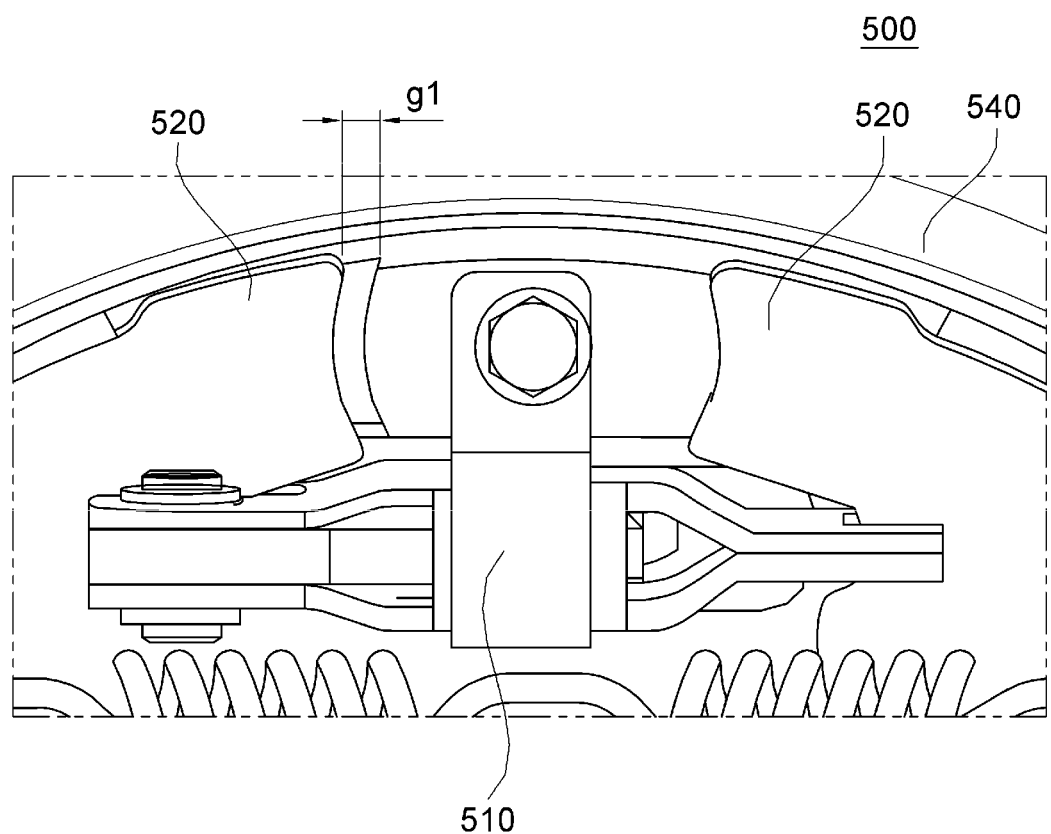

Referring to FIG. 5, when the user releases an operation of the main brake or the friction members of the brake shoes 520 contract due to a change in temperature after the electronic parking brake apparatus is locked in a state in which the main brake has been operated, one gap g2 of the gaps g1 and g2, which are formed at both sides of the anchor block 530, may be narrowed or completely disappear, and the other gap g1 may be relatively widened to the extent that the one gap g2 is narrowed.

This situation means that the brake shoe 520 at the right side (the right side in FIG. 5) is not in close contact with the drum 540, such that frictional braking force is decreased, and braking force is decreased during a braking operation or braking force is decreased due to contraction of the friction member.

Figure 6:
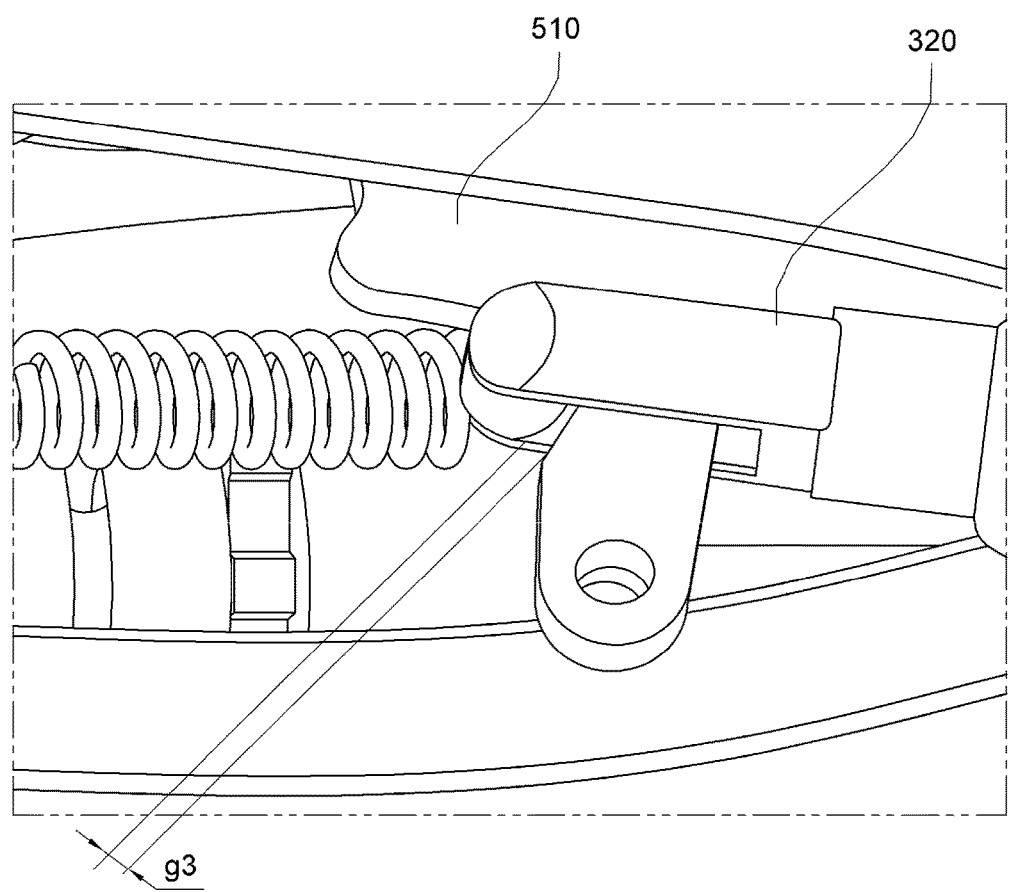

When the gap at one side of the anchor block 530 disappears after the electronic parking brake apparatus is locked as illustrated in FIG. 5, a predetermined gap g3 is formed between the operating lever 510 and the cable 320 as illustrated in FIG. 6.

The gap g3 between the operating lever 510 and the cable 320 disappears when the aforementioned elastic member 410 pulls the cable 320 by using elastic restoring force, and the operating lever 510 pushes the brake shoe 520 radially outward while being operated in conjunction with the cable 320 so as to allow the brake shoe 520, which has been spaced apart from the drum, to come back into close contact with the drum.

Therefore, the electronic parking brake apparatus may increase frictional braking force that has been decreased, thereby stably braking the vehicle.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An electronic parking brake apparatus comprising:
a power generating unit which generates power based on an external signal;
a braking force transmission unit which is coupled to the power generating unit in a threaded connection manner, rectilinearly moves by the power, and transmits braking force generated by the rectilinear movement;
a braking force supplementing unit which is disposed to be adjacent to the power generating unit while surrounding the braking force transmission unit; and
a brake body part which is connected with the braking force transmission unit and stops a vehicle by using the braking force,
wherein the power generating unit includes:
a motor which generates power based on the external signal;
a gear unit which is operated by an operation of the motor; and
a nut screw which is connected with the gear unit and rotated by an operation of the gear unit,
wherein the braking force transmission unit includes:
a bolt screw which is coupled to the nut screw in a threaded connection manner, and rectilinearly moves in a longitudinal direction while penetrating the nut screw; and
a cable which has one end connected with the bolt screw, and the other end connected to the brake body part,
wherein the braking force supplementing unit includes:
a cylindrical portion which is disposed in a direction that faces the nut screw, and has a hollow circular shape to accommodate the bolt screw; and
an elastic member which is adjacent to the nut screw, and surrounds an outer surface of the cylindrical portion,
wherein the brake body part includes:
an operating lever which is connected with the cable and operated depending on the braking force;
brake shoes which have inner portions coupled to the lever, and have both sides that expand by the operating lever that is operated depending on the braking force;
an anchor block which is connected with the operating lever, and supports both sides of the brake shoes; and
a drum which accommodates therein the brake shoes, and stops the vehicle by using frictional force that is generated when outer portions of the brake shoes come into direct contact with an inner wall of the drum by the expansion of the brake shoes, and wherein when a predetermined gap is formed between the anchor block and the brake shoe due to a decrease in braking force, the elastic member removes the predetermined gap by moving the nut screw using elastic restoring force.

2. The electronic parking brake apparatus of claim 1, wherein the elastic member is a coil spring or a disc spring.

3. The electronic parking brake apparatus of claim 1, wherein the nut screw presses the elastic member while being moved in a direction of the cylindrical portion by the rectilinear movement of the bolt screw.

4. The electronic parking brake apparatus of claim 1, wherein the cylindrical portion is spaced apart from the nut screw by 3 mm or more.

5. An electronic parking brake apparatus comprising:
a power generating unit;
a braking force transmission unit coupled to the power generating unit;
a braking force supplementing unit disposed adjacent to the power generating unit; and
a brake body part coupled to the braking force transmission unit,
wherein the power generating unit includes:
  a motor having a rotating shaft;
  a gear unit coupled to the rotating shaft of the motor; and
  a nut screw coupled to the gear unit and rotating about an axis,
wherein the braking force supplementing unit includes:
  a cylindrical portion having a hollow cylinder shape; and
  an elastic member contacting the nut screw and surrounding an outer surface of the cylindrical portion, and
wherein the elastic member directly contacts the nut screw.

6. The electronic parking brake apparatus of claim 5, wherein the braking force transmission unit includes:
a bolt screw having one or more threads coupled to the nut screw, the bolt screw penetrating the nut screw and the cylindrical portion; and
a cable having a first end coupled to the bolt screw and a second end coupled to the brake body part.

7. The electronic parking brake apparatus of claim 6, wherein the brake body part includes:
an operating lever coupled to the second end of the cable,
wherein, when a decrease in a frictional force between the brake body part and a wheel of a vehicle causes a gap between the operating lever and the second end of the cable, the elastic member removes the gap by pulling the cable.

8. An electronic parking brake apparatus comprising:
a power generating unit;
a braking force transmission unit coupled to the power generating unit;
a braking force supplementing unit disposed adjacent to the power generating unit; and
a brake body part coupled to the braking force transmission unit,
wherein the power generating unit includes:
  a motor having a rotating shaft;
  a gear unit coupled to the rotating shaft of the motor; and
  a nut screw coupled to the gear unit and rotating about an axis,
wherein the braking force supplementing unit includes:
  a cylindrical portion having a hollow cylinder shape; and
  an elastic member surrounding an outer surface of the cylindrical portion,
wherein the braking force transmission unit includes:
  a bolt screw having one or more threads coupled to the nut screw, the bolt screw penetrating the nut screw and the cylindrical portion; and
  a cable having a first end coupled to the bolt screw and a second end coupled to the brake body part,
wherein the brake body part includes an operating lever coupled to the second end of the cable, and
wherein, when a decrease in a frictional force between the brake body part and a wheel of a vehicle causes a gap between the operating lever and the second end of the cable, the elastic member removing the gap by pulling the cable.

* * * * *